United States Patent [19]

Paisner et al.

[11] Patent Number: 4,793,907
[45] Date of Patent: Dec. 27, 1988

[54] METHOD FOR ISOTOPE ENRICHMENT OF MERCURY-196 BY SELECTIVE PHOTOIONIZATION

[75] Inventors: Jeffrey A. Paisner, San Ramon; John K. Crane, Pleasanton, both of Calif.

[73] Assignee: The United States of America as represented by the United States Department of Energy, Washington, D.C.

[21] Appl. No.: 898,084

[22] Filed: Aug. 20, 1986

[51] Int. Cl.⁴ ............................................. B01D 4/34
[52] U.S. Cl. ........................... 204/157.22; 204/157.2; 204/157.21; 250/423 P; 250/424
[58] Field of Search ........... 204/157.2, 157.21, 157.22; 250/251, 288, 423 P, 425, 424

[56] References Cited

U.S. PATENT DOCUMENTS

| | | | |
|---|---|---|---|
| 2,713,025 | 7/1955 | Billings | 204/157.21 |
| 3,983,019 | 9/1976 | Beergheaud | 204/157.21 |
| 4,217,494 | 8/1980 | Levy | 250/282 |
| 4,334,883 | 6/1982 | Robinson et al. | 204/157.22 |
| 4,648,951 | 3/1987 | Maya | 204/157.21 |

FOREIGN PATENT DOCUMENTS 714697 10/1982 U.S.S.R. ......................... 204/157.21

OTHER PUBLICATIONS

Dyer, P., et al., "Three-Step Photoionization of Mercury for Application to Separation of Mercury Isomers", Conference: Int'l. Conf. on Lasers, New Orleans, LA., USA, Dec. 13, 1982, Conf.-821203-2.
*Laser Photoionization Spectroscopy*, V. S. Letokhov, Academic Press, Inc., Harcourt Brace Jovanovich, Publ., NY, 1987, p. 326 appendix.

*Primary Examiner*—John F. Terapane
*Assistant Examiner*—Virginia B. Caress
*Attorney, Agent, or Firm*—P. Martin Simpson, Jr.; L. E. Carnahan; Judson R. Hightower

[57] ABSTRACT

A method is provided for selectively photoionizing $^{196}Hg$ atoms in a vapor utilizing a three or four-step photoionization process.

18 Claims, 1 Drawing Sheet

METHOD FOR ISOTOPE ENRICHMENT OF MERCURY-196 BY SELECTIVE PHOTOIONIZATION

FIELD OF THE INVENTION

The present invention relates to a method for isotope enrichment of $^{196}Hg$ and, in particular, to a method for isotope enrichment of $^{196}Hg$ by selective photoionization.

The United States Government has rights in this invention pursuant to Contract No. W-7405-ENG-48 between the United States Department of Energy and the University of California for the operation of Lawrence Livermore National Laboratory.

BACKGROUND OF THE INVENTION

Mercury vapor is used as a fluorescent light source and in its natural state contains about 0.15% of the isotope $^{196}Hg$. It would be desirable to enrich the $^{196}Hg$ content of mercury vapor, since it has been found that enrichment to a level of about 3% $^{196}Hg$ increases the efficiency of a conventional fluorescent lamp by approximately 5%. Enrichment of an atomic vapor in one or more isotopes may be achieved through separation processes which operate on very small differences between the chemical or physical properties of the isotopes. One method of isotope enrichment, utilized in enriching $^{235}U$, operates by selective excitation of energy states of one uranium isotope without corresponding excitation and ionization of the other uranium isotopes. In achieving a high degree of ionization of the selected isotope, the radiation, which is typically laser radiation, must be chosen to have certain specific photon energies which correspond to particular radiative transitions in the selected isotope $^{235}U$, but not of the other isotopes.

However, selection of the energies to be used for excitation, as well as the sources of the radiation energy which is used, is not readily apparent, particularly when working in a system other than uranium vapor. Therefore, with regard to mercury vapor it would be desirable to develop a system whereby precise energies for the selective excitation and photoionization of $^{196}Hg$, as well as radiation sources for these energies, can be determined and utilized.

SUMMARY OF THE INVENTION

It is an object of the present invention to provide a method for isotope enrichment of $^{196}Hg$ by selective photoionization.

It is a further object of the present invention to provide a method for the isotope enrichment of $^{196}Hg$ by selective photoionization utilizing solid state lasers or combinations of solid state lasers with other lasers, such as, copper vapor lasers or copper vapor pumped dye lasers, which provide predetermined energies.

Briefly, the present invention provides a method for isotope enrichment of $^{196}Hg$ by selective photoionization comprising the steps of subjecting a vapor of the naturally-occurring mixture of mercury isotopes to radiation emitted by a first radiation source; subjecting the vapor to radiation emitted by a second and, alternatively, also a third radiation source; subjecting the vapor to a radiation emitted by a final radiation source; whereby the additive effect of the radiation sources upon the vapor ionizes $^{196}Hg$ atoms, but not the other isotopes of mercury. By exposing the vapor to a field which deflects the ionized $^{196}Hg$ atoms the ionized $^{196}Hg$ atoms may be separated from the non-ionized atoms of the mixture.

Additional objects, advantages and novel features of the present invention will be set forth in part in the following description and in part will become apparent from those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated in and form a part of the specification.

Together with the following detailed description, these serve to explain the principles of the invention.

DETAILED DESCRIPTION OF THE PREFERRED EMBODIMENTS

Reference will be made in detail to the preferred embodiments of the invention, in conjunction with the accompanying drawing. While the invention will be described in connection with the preferred embodiments, it will be understood that the invention is not limited thereto. The invention is intended to cover all alternatives, modifications and equivalents as may be included within the spirit and scope of the invention as defined herein and by the appended claims.

In accordance with the present invention an enrichment in mercury vapor of the isotope $^{196}Hg$ is accomplished by exposing a vapor flow of mercury vapor to radiant energy in the form of radiation from a plurality of lasers to produce ionization of the $^{196}Hg$ isotope without ionization of the other isotopes in the environment. In accordance with the preferred embodiments of the present invention, particular frequencies of radiant energy produced by lasers are advantageously selected to correspond to specific energy transitions of $^{196}Hg$ from its ground energy state to a first intermediate excited energy state, then to a second, higher intermediate excited energy state. In one embodiment, a third excitation step is utilized to a higher $^{196}Hg$ energy state. Then, a final laser radiation is applied to excite the $^{196}Hg$ atoms from the second (or third), intermediate excited energy state to the ionization continuum.

To complete the enrichment system of $^{196}Hg$, the $^{196}Hg$ ions may be electromagnetically separated for collection apart from the remaining components of the vapor flow using known methods, such as by using cross field MHD accelerator techniques.

In a specific application, the present invention is useful for the enrichment of the $^{196}Hg$ isotope of mercury from naturally occurring mercury sources. As used herein the term radiant energy is intended to include one or more frequencies of radiation, however achieved, and the term transition is intended to include the possibility of one or more energy steps.

Figure 1:
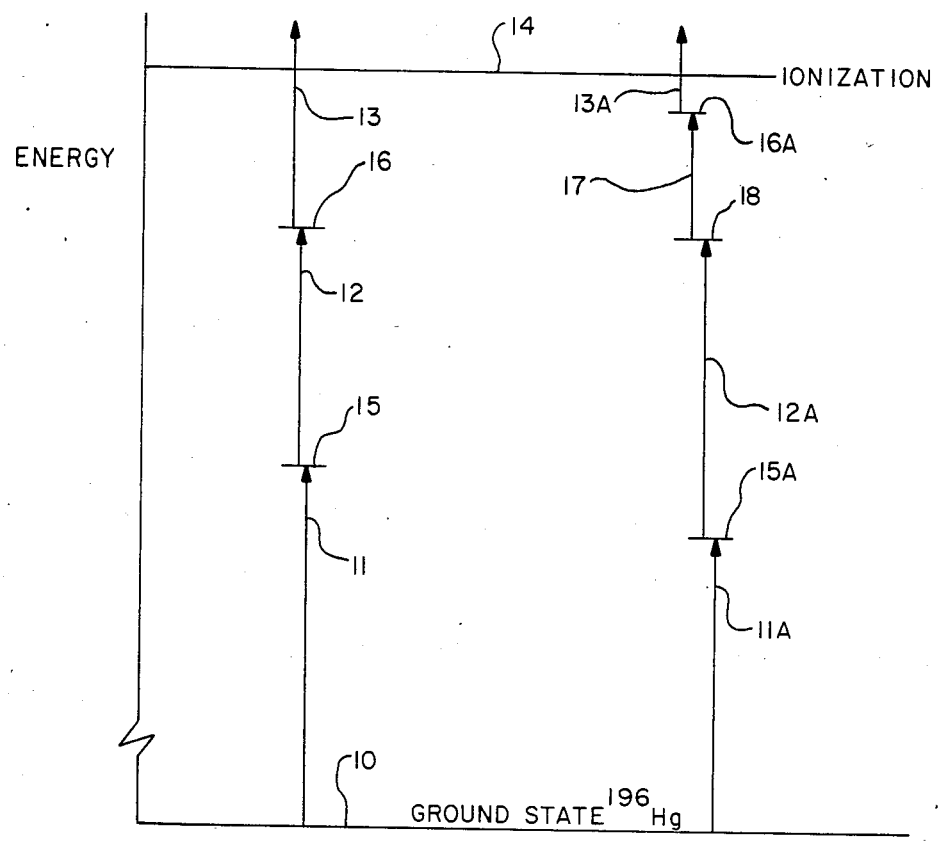
FIG. 1 is an energy level diagram for illustrating the processes associated with the present invention.

By reference to FIG. 1 there are shown exemplary energy steps employed in achieving the photoionization of $^{196}Hg$ in accordance with the present invention. A ground energy level 10 for $^{196}Hg$ atoms is indicated and may be generally defined as the zero energy level. An ionization level 14 is also shown which may be taken at the energy level of approximately 84184 wave numbers, or approximately 10.43 ev. From the ground level 10, a first energy step 11 or transition is produced according to the invention by finely tuned laser radiation, preferably characterized by 2537 Å, which selectively excites the $^{196}$Hg isotope of mercury without corresponding excitation of the other mercury isotopes. An intermediate energy level 15 (at 39412 wave numbers) below the ionization level 14 is achieved by the transistion 11. From energy level 15, a second transition 12 is produced by further radiant energy by finely tuned laser radiation, preferably characterized by 2655 Å or 2279 Å, which puts the excited particles from energy level 15 to a second intermediate energy level 16. Finally, photoionization is achieved by putting the excited atoms in energy level 16 above the ionization level 14 by subjecting these particles to further radiant energy 13, preferably characterized by a wavelength less than about 1.40 microns. Preferred wavelengths of energy 13 are 1.06 and 1.35 microns.

Alternatively, a four-step ionization process for $^{196}$Hg may be utilized as shown in the figure. Transitions 11A, 12A, 17 and 13A which lead to respective energy states 15A, 18, 16A and ionization may be achieved preferably by laser radiation characterized by 2537 Å, 4358 Å, 4786 Å, and 10.6 microns (or 1.35 microns).

It is a particular advantage of the present invention that some or all of the above identified transitions 11, 12 and 13, are achievable by use of solid state lasers or combinations of solid state lasers with coppe vapor or copper vapor pumped dye lasers. The first transition 11 may be achieved by energy in the ultraviolet range and therefore is particularly adaptable for implementation by use of alexandrite lasers which lase in the range of about 7300 to 7800 Å. By application of known non-linear conversion methods, such as by use of KDP (potassium dihydrogen phosphate) or RD*A (rubidium dideuterium phosphate) crystals. the frequency from an alexandrite laser tuned to 7611 Å may be tripled to achieve precisely the wavelength required to be resonant only with the $^{196}$Hg isotope at 2537 Å.

The second transition 12 may be implemented by use of solid state Nd$^{3+}$-doped materials known to those in the laser art. These materials lase in the range of 1.06 microns and may be finely tuned to the precise wavelength such that when converted to 2655 Å by first doubling then quadrupling using nonlinear crystals, the resultant laser will be resonant with the second step transition for $^{196}$Hg.

The third transition 13 may be implemented by use of a Nd$^{3+}$-doped solid state laser, utilizing any of the materials known to be capable of high average power operation. These materials typically lase in a small range centered at 1.06 microns or 1.35 microns. Transistion 13 may alternatively be implemented by a copper vapor or copper vapor pumped dye laser. Fine tuning of the third-step laser is not critical for photoionization of the $^{196}$Hg isotope.

Alternatively, some of the required transitions may be achieved by copper vapor lasers (CVL). For example, dye-pumped CVL's may be tuned to wavelengths of 2537 Å, 2653 Å, or 7611 Å. The latter wavelength may be tripled to 2537 Å using non-linear crystals such as urea. Dye-pumped lasers may also be tuned to 2279 Å, 4358 Å and 4786 Å to affect respectively, for example, transitions 12, 12A and 17 shown in the figure.

In a further embodiment, the final transitions 13 and 13A which lead to ionization may be affected by infrared carbon dioxide lasers. The use of certain dioxide lasers is advantageous since photoionization rates of $^{196}$Hg from excited states is greater than the rates of photoionization using solid state lasers. Also, production of radiation at infrared frequencies is more economical than radiation from solid state lasers.

Figure 2:
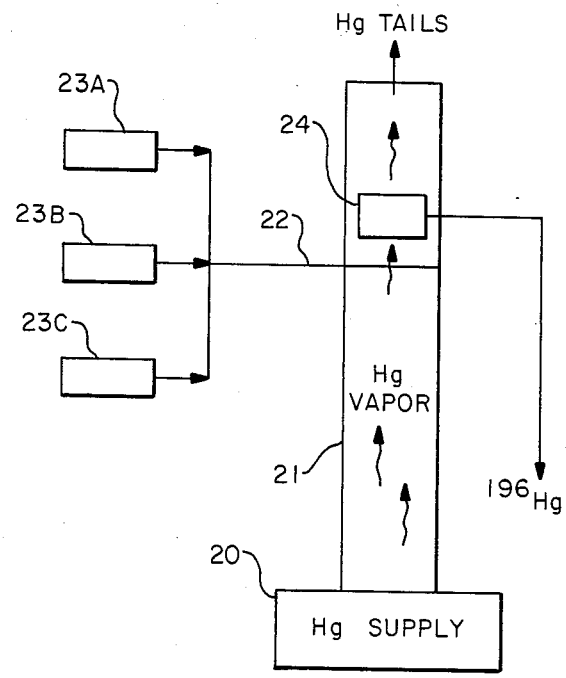
FIG. 2 is a schematic illustration of a system for separating $^{196}Hg$ from naturally occurring mercury.

In implementing the process of the present invention, lasing apparatus and ion vapor separating apparatus known in the art may be typically employed. A typical system is schematically shown in FIG. 2 involving a laser system employing laser tuning systems to attain the desired frequencies for the use in the present invention. A source of mercury supply 20 is vaporized and the mercury vapor is enclosed within a conduit 21. At some point along the conduit the vapor is exposed to one or more laser beams 22 containing the laser energy at the desired frequencies. As shown these frequencies have been combined into a single beam 22 and result from a plurality of lasers 23a, b and c, each emitting laser energy at a different frequency. Additionally, one or more stages of amplification may be included within the laser systems as is found desirable in practicing the invention.

To separate the ionized atoms from the non-ionized particles, the vapor mixture containing the ionized atoms may typically be extracted by exposure to a pulsed or DC static electric field on a collection device 24. The collected $^{196}$Hg isotope may then be removed from the collection device and the remaining nonionized mercury vapor (the tails) may be withdrawn and recycled to the mercury supply.

In the instance according to the present invention, the isotope which is enriched, $^{196}$Hg, is collected by electrically biased collection plates. In a typical process the collection plates also collect some non-ionized atoms, however, the overall mixture of substances collected by the collection plates are enriched by the isotope which was selectively ionized in the vapor state.

The foregoing description of the preferred embodiments of the invention is provided for purposes of illustration and description. It is not intended to be exhaustive or to limit the invention to the precise forms disclosed and obviously many modifications and variations are possible in light of the above teachings. The embodiments were chosen and described in order to best explain the principles of the invention and their practical application to thereby enable others skilled in the art to best utilize the invention and the various embodiments and with various modifications as are suited to the particular use contemplated and it is intended that the scope of the invention be defined by the claims appended hereto.

What is claimed is:

1. A method for selectively photoionizing $^{196}$Hg atoms in a vapor comprising the naturally-occurring distribution of mercury isotopes, comprising the steps of
   subjecting said vapor to radiation emitted by a first radiation source at a first determined wavelength of 2537 Å;
   subjecting said vapor to radiation emitted by a second radiation source at a second wavelength of 2655 Å; and
   subjecting said vapor to radiation emitted by a third radiation source at a third wavelength of less than about 1.40 microns whereby the additive effect of said sources upon said vapor selectively ionizes $^{196}$Hg atoms.

2. The method according to claim 1 wherein said radiation sources comprise one or more solid state laser.

3. The method according to claim 2 wherein said first radiation source comprises an alexandrite solid state laser.

4. The method according to claim 2 wherein said second radiation source comprises a Nd$^{3+}$-doped solid state laser.

5. The method according to claim 2 wherein said third radiation source comprises a Nd$^{3+}$-doped solid state laser.

6. The method according to claim 1 wherein the radiation by at least one of said radiation sources comprises a copper vapor laser or copper vapor pumped dye laser.

7. The method according to claim 6 wherein said first radiation source comprises a copper vapor laser.

8. The method according to claim 6 wherein said second radiation source comprises a copper vapor laser.

9. A method for selectively photoionizing $^{196}$Hg atoms in a vapor comprising the naturally-occurring distribution of mercury isotopes, comprising the steps of subjecting said vapor to radiation emitted by a first radiation source at a first determined wavelength of 2537 Å;

subjecting said vapor to radiation emitted by a second radiation source at a second wavelength of 2279 Å; and subjecting said vapor to radiation emitted by a third radiation source at a third wavelength of less than about 1.40 microns whereby the additive effect of said sources upon said vapor selectively ionizes $^{196}$Hg atoms.

10. The method according to claim 9 wherein said first radiation source comprises an alexandrite solid state laser.

11. The method according to claim 9 wherein said first radiation source comprises a copper vapor laser.

12. The method according to claim 9 wherein said second radiation source comprises a copper vapor laser.

13. The method according to claim 9 wherein said third radiation source comprises a Nd$^{3+}$-doped solid state laser.

14. A method for selectively photoionizing $^{196}$Hg atoms in a vapor comprising the naturally-occurring distribution of mercury isotopes, comprising the steps of subjecting said vapor to radiation emitted by a first radiation source at a first determined wavelength of 2537 Å;

subjecting said vapor to radiation emitted by a second radiation source at a second wavelength of 4358 Å;

subjecting said vapor to radiation emitted by a third radiation source at a third wavelength of 4786 Å; and subjecting said vapor to radiation emitted by a fourth radiation source at a fourth wavelength of less than about 1.40 microns whereby the additive effect of said sources upon said vapor selectively ionizes $^{196}$Hg atoms.

15. A method according to claim 14 wherein at least one of said radiation sources comprises a copper vapor laser or copper vapor pumped dye laser.

16. A method according to claim 14 wherein the radiation by at least one of said radiation sources comprises a solid state laser.

17. A method according to any of claims 1 through 13 wherein said third radiation source comprises an infrared carbon dioxide laser.

18. A method according to any of claims 14 through 16 wherein said fourth radiation source comprises an infrared carbon dioxide laser.

* * * * *